(No Model.) 4 Sheets—Sheet 1.
T. B. DIXON.
TRACK INSTRUMENT.

No. 543,597. Patented July 30, 1895.

Fig. 1.

Witnesses:—
D. N. Haywood,
W. B. Dixon

Inventor:—
Thomas B. Dixon
By E. M. Marble & Sons
Attorneys.

(No Model.) 4 Sheets—Sheet 2.

T. B. DIXON.
TRACK INSTRUMENT.

No. 543,597. Patented July 30, 1895.

Witnesses:
D. H. Hayford
W. B. Dixon

Inventor:-
Thomas B. Dixon
By E. M. Marble & Sons
Attorneys.

(No Model.) 4 Sheets—Sheet 3.
T. B. DIXON.
TRACK INSTRUMENT.

No. 543,597. Patented July 30, 1895.

Witnesses:
D. H. Haywood
W. B. Dixon

Inventor:
Thomas B. Dixon
By E. M. Marble & Son
Attorneys.

(No Model.) 4 Sheets—Sheet 4.
T. B. DIXON.
TRACK INSTRUMENT.

No. 543,597. Patented July 30, 1895.

Witnesses:
D. N. Hayward
W. B. Dixon

Inventor:
Thomas B. Dixon
By E. M. Marble & Sons
Attorneys.

UNITED STATES PATENT OFFICE.

THOMAS B. DIXON, OF HENDERSON, KENTUCKY.

TRACK-INSTRUMENT.

SPECIFICATION forming part of Letters Patent No. 543,597, dated July 30, 1895.

Application filed August 20, 1894. Serial No. 520,811. (No model.)

*To all whom it may concern:*

Be it known that I, THOMAS B. DIXON, a citizen of the United States, residing at Henderson, in the county of Henderson and State of Kentucky, have invented certain new and useful Improvements in Track-Instruments; and I do hereby declare the following to be a full, clear, and exact description of the invention, such as will enable others skilled in the art to which it appertains to make and use the same.

My invention relates to track-instruments for operating the circuits of electrical railway signaling systems, and more particularly to track-instruments for operating the circuits of registering systems, wherein the signal-circuits are controlled by automatic registers which count or register wheels, cars, or trains entering a block or section of track; but the track-instrument herein described is not confined to use in registering systems alone, and may be used to operate the circuits of any system of railway-signals using track-instruments.

The objects of my invention are, first, to provide a track-instrument which shall be capable of operating a number of circuits, both normally closed and normally open, of operating such circuits, if desired, each time that a wheel or pair of wheels passes over the track-instrument, and of operating different circuits according to the direction in which the wheels pass over the track-instrument; second, to provide a track-instrument which, while fulfilling the above conditions, shall operate both registering and canceling circuits correctly when wheels which have passed partly over the track-instrument change their direction of movement and move backward over the track-instrument; third, to provide a track-instrument which shall be capable of preventing the operation of circuits, if desired, so long as wheels are moving over the track-instrument and for a moment after such wheels have left the track-instrument; fourth, to provide a track-instrument which, while fulfilling the above conditions, shall be simple, compact, durable, not liable to derangement, certain in action, and as inexpensive as possible; fifth, to provide a track-instrument which shall be capable of extreme rapidity of operation; sixth, to provide a track-instrument which may not be injured or the operation of which may not be interfered with by exposure and which shall not be affected by shock or jar of passing trains; and, seventh, to provide a track-instrument which shall be capable of general adaptation and use in the circuits of all systems of railway-signals using track-instruments. These objects are attained in the track-instrument herein described, and illustrated in the drawings which accompany and form a part of this application, in which the same reference-numerals indicate the same or corresponding parts, and in which—

In my track-instrument, in order to prevent any possibility of its operation being affected in any way by shock or vibration due to the passage of trains, while yet having all of its moving parts as small and light as is advisable in a registering track-instrument, the parts of which must be capable of moving with great rapidity in order to operate registering-circuits for the wheels of rapidly-moving trains, I have preferred to have its mechanisms operated by electromagnets the circuits of which are connected to short insulated track-sections, so that they will be operated by wheels passing on such track-sections, or the circuits may be operated by contact-points operated by rail-levers or similar devices arranged to be actuated by the wheels of trains upon the track or by any other suitable contact device operated from the moving trains. The track-instrument may therefore be placed at such a distance from the track that it will be unaffected by the shock or vibration due to passing trains or by any possible accident on the railway. Its parts may likewise be made very small and light, for inasmuch as the parts of the instrument need never be subjected to severe strain there is no occasion for the use of strong and heavy parts, and the machine is thus much better adapted for extremely rapid action. Moreover, because of its small size, the track-instrument may be constructed quite cheaply, and it may be so inclosed and protected that it will require inspection and attention only at rare intervals.

In the drawings, 10 is a case which surrounds and protects the mechanism of the track-instrument.

11 and 11' are two electromagnets on opposite sides of the center of the casing 10, by which the principal portion of the mechanism of the track-instrument is operated and which may be termed "operating-magnets." These magnets are supported by suitable brackets 12 and 12', secured to the sides of the casing 10. The armatures 13 and 13' of these two operating-magnets are each attached to a framework, formed by two armature-levers 14 and 15 and 14' and 15' joined together by pivot-rods 16 and 16' and by braces 17 and 17'. The ends of the rods 16 and 16' engage with suitable pivot-screws, which are supported by suitable brackets secured to the casing 10, but insulated therefrom, the connections between the rods 16 and 16' and the pivot-screws being, preferably, by conical bearings, so that friction at the bearings may be reduced to the lowest possible amount. Suitable stop-screws, engaging with the braces 17 and 17', limit the motion of the armatures and levers, and suitable springs are provided for drawing the armatures and levers away from the magnets 11 and 11' when those magnets are de-energized.

18 and 18' are ratchet-wheels revolubly mounted, but independent of each other, and each placed slightly to one side of the end of one of the levers 14 and 14'. These levers are provided with pawls 19 and 19', pressed forward by suitable springs, which pawls each engage with a tooth of its corresponding ratchet-wheel when its armature-lever moves upward and so causes this ratchet-wheel to rotate. The amplitudes of movement of the armature-levers 14 and 14' are so adjusted with respect to the pitch of the ratchet-teeth that one tooth of a wheel will be carried upward for each movement upward of the armature-lever. Each ratchet-wheel is provided with a stop-pawl 20 or 20', which engages with the teeth of that wheel and prevents recoil thereof, and these stop-pawls carry at their ends contact-points, the function of which will be hereinafter described.

To the bottom of each armature-lever 14 or 14' is attached a contact-strip 21 or 21', which is adapted to engage with the stop-pawl 20' or 20 of the opposite ratchet-wheel. Each contact-strip is provided with a suitable stop-screw 22 or 22', which regulates the position of the extremity of the contact-strip at which contact may be made or broken with the contact-point of the stop-pawl 20' or 20 with which it makes contact.

30 is an arm, known as the "swinging arm," keyed to a shaft 31, which shaft is revolubly mounted. The swinging arm is nearly opposite the ends of the armature-levers 15 and 15'. These levers are provided with links 32 and 32', which have on their ends rollers 33 and 33', bearing against the sides of the swinging arm, and springs 34 and 34' press these rollers against the swinging arm. When the levers 15 and 15' are up, with the armature 13 and 13' in close proximity to the poles of the magnets, which is their normal position, the rollers 33 and 33' are slightly above the center of the shaft 31 and bear against the upper portion of the arm 30, which is semi-circular, so that the pressure of the rollers 33 and 33' does not tend to cause the arm to swing. When one of the levers 15 or 15' falls its roller likewise descends, and bearing against the swinging arm 30 deflects it to the right or left, as the case may be, thus rotating the shaft 31. To the shaft 31 is secured a contact-lever 35, which preferably should be insulated from the shaft, though this is not always necessary where, as in the drawings, but one contact-lever is attached to the shaft 31. From a frame 36, attached to the casing 10, there is pivotally supported a contact-lever 37, which engages with the contact-lever 35 upon one side thereof. A contact-screw 38, carried by the frame 36, likewise engages with the contact-lever 37. Contact-lever 37 and screw 38 should be insulated from the frame 36. Springs 39 and 40, attached to the contact-levers 35 and 37, produce sufficient pressure between the contact-points to make good electrical contacts. These springs oppose each other and practically counterbalance one another.

41 and 41' are termed "locking-magnets." As will be explained subsequently, they are in the same circuit with the operating-magnets 11 and 11', respectively. Their armatures 42 and 42' are carried by pivoted armature-levers 43 and 43', termed "locking-levers," the ends of which are adapted to engage with notches 44, 45, and 46 in the end of the swinging arm 30, though when this arm is in its central position, as shown in the drawings, the ends of the armature-levers 43 and 43' are opposite the projections of the swinging arm, which lie between these notches.

The above constitutes the main portion of the mechanism of my track-instrument, and before proceeding to the description of the mechanism shown particularly in Fig. 5 the circuits employed for the operation of the track-instrument and the method of operation of the mechanism which has been under consideration heretofore will be described.

Figure 5:
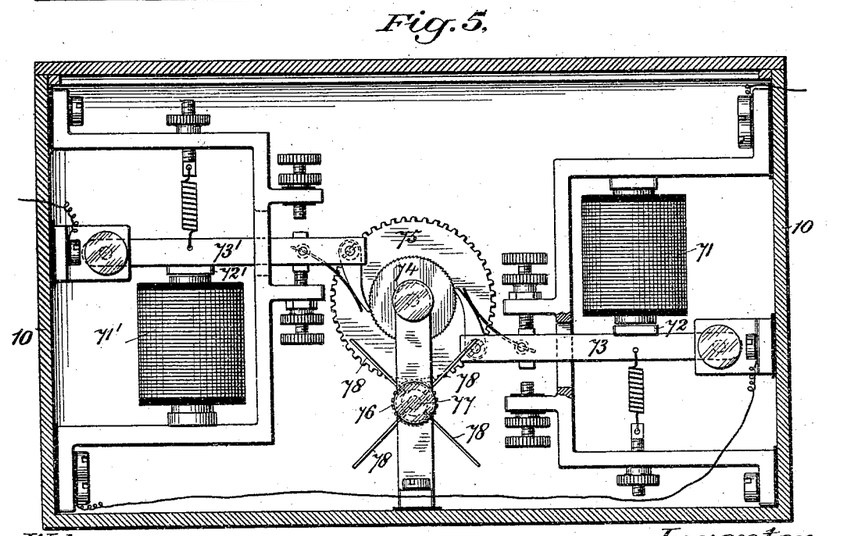
Fig. 5 is a transverse sectional elevation taken on the line 5 5 of Fig. 1, and omitting the mechanism shown in Figs. 3 and 4 for the sake of clearness.
Figure 6:
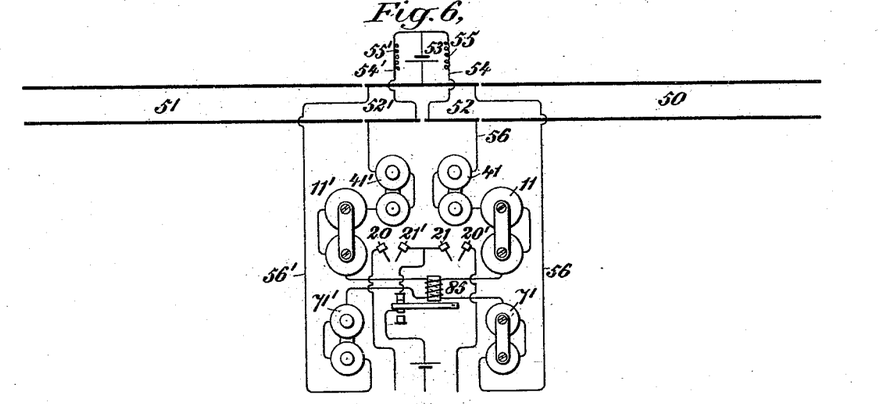
Figs. 6 and 7 are diagrammatic figures showing different circuits for operating the track-instrument by means of short insulated track-sections and suitable circuits and batteries connected thereto.

Referring particularly to Fig. 6, which represents diagrammatically the preferred connections of the circuits for operating the track-instrument, 11 and 11' are the operating-magnets of the track-instrument and 41 and 41' the locking-magnets. 50 and 51 are sections of a railway-track, and between them are two short track-sections 52 and 52', by which the track-instrument mechanism is operated. In the arrangement of circuits of Fig. 6 only the lower rail of these sections is divided, the upper rail being continuous, and to this upper rail is connected one pole of a battery 53. From the other pole there run two circuits, one through conductor 54 and resistance-coil 55 to the lower rail at one end of track-section 52, thence from the other end of the track-section through conductor 56, locking-magnet 41, operating-magnet 11, through the magnet of a relay 85 and through a magnet 71, belonging to mechanism shown in Fig. 5, to be hereinafter described, provided that mechanism be used in the track-instrument to the upper rail of track-section 52. There is a similar circuit connected to the rails of track-section 52' and to the magnets 41' and 11'. In each of these track-sections the circuit of battery 53 is short-circuited when a pair of wheels is on that track-section, and such short-circuiting will de-energize the magnets of the track-instrument of that circuit. The resistance-coils 55 and 55' are employed to prevent substantially all of the current of the battery from being diverted through that circuit which is short-circuited.

The length of the track-sections 52 and 52' is proportioned according to what class of occurrences it may be desired to have the track-instrument operate for. As above stated, this track-instrument is particularly intended for use in registering signal systems in connection with automatic registers, and in such systems it is usually preferable to register and cancel the individual pairs of wheels. In such case the length of the track-sections 52 and 52' together must be made shorter than the distance between two adjacent axles of any car, and with rail-sections of such length the contact-points of the track-instrument will be operated each time that a pair of wheels pass over the track-instrument, or, more properly, over the track-instrument rail-sections 52 and 52'. By properly proportioning the length of the track-sections 52 and 52' it may be possible to cause the track-instrument to operate once, and once only, for every car-truck, or for every car, and if the track-sections be made longer than the length of the longest car then the track-instrument will be operated only once while a train is passing over it. In this case the track-instrument may be used to operate a register which registers trains as units, or may be used with non-registering systems.

In the following description of the operation of the track-instrument it will be assumed that the length of the track-sections 52 and 52' is less than the distance between any two adjacent axles of a car, so that the track-instrument is operated each time that a pair of wheels pass over it.

Considering now the operation of the track-instrument in so far as its mechanism has been hitherto described, and supposing a train on the section of track 50 of Fig. 6 to pass over the track-instrument track-sections, when the first pair of wheels enter track-section 52 the circuit of battery 53 in this track-section is short-circuited and operating-magnet 11 and locking-magnet 41 are de-energized. The armature 13 of magnet 11 is pulled downward by its spring and the roller 33 of armature-lever 15 in descending presses the swinging arm 30 to the left, moving the contact-levers 35 and 37 to the right and breaking contact between contact-lever 37 and contact-screw 38. One set of contact-points, which is normally closed, has been operated, therefore, by the passage of the first pair of wheels upon the track-instrument track-section.

Inasmuch as the magnet 41 is de-energized, the rocking lever 43 presses against the bottom of the swinging arm 30, and when the roller 33 has pressed the swinging arm sufficiently far to the left the end of the locking-lever 43 will enter the notch 44 in the bottom of the swinging arm, holding the same locked in that position.

When the first pair of wheels pass onto track-section 52', the circuit of battery 53 in this track-section is likewise short-circuited and operating-magnet 11' and locking-magnet 41' are de-energized. The locking-lever 43' therefore springs up into the notch 45 of the swinging arm 30 and the armature 13' and armature-levers 14' and 15' descend. At the same time, since the circuit of battery 53 in track-section 52 is no longer short-circuited magnets 11 and 41 are again energized, the armature 13 and armature-levers 14 and 15 rise with roller 33, and locking-lever 43 falls; but locking-lever 43' has entered notch 45 of the swinging arm 30 before locking-lever 43 ceased to hold the swinging arm, so that, although roller 33' is now down and pressing against the swinging arm 30, this arm is still held to the left and the contact-points operated by the swinging arm are undisturbed.

As the armature-lever 14 rises, its pawl 19 engages with a tooth of the ratchet-wheel 18 and revolves the ratchet-wheel through the space of one tooth. In so doing it causes the pawl 20 to descend slightly, but as at the same time when the pawl 20 is descending the lever 14', and consequently the contact-strip 21', is likewise descending or is entirely down the pawl does not make contact with the contact-strip.

When the first pair of wheels pass from track-section 52' into the portion 51 of the track, magnets 11' and 41' are again energized, the swinging arm 30 is released by the locking-lever 43' and swings back to central position, thus causing contact-lever 37 and contact-screw 38 to again come into contact, and the armature 13' with armature-levers 14' and 15' rises, the pawl 19' engaging with a tooth of ratchet-wheel 18' and revolving the said wheel through the space of one tooth. The pawl 20' therefore descends, in so doing engaging with the contact-strip 21 of the lever 14, which lever is now at the upper limit of its travel, and the contact thus made momentarily completes a circuit through pawl 20' and contact-strip 21.

The operation as above described constitutes one complete cycle in the operation of the track-instrument. When the pair of wheels have passed off from the second track-instrument track-section all of the parts of the track-instrument are brought back to their normal positions, and as the parts are small and light these parts will move back to normal position before a following pair of wheels can pass upon the track-instrument track-section.

It will be noted that in the cycle of operations above described one pair of normally-closed contact-pieces—viz., lever 37 and screw 38—have been separated momentarily, and one pair of normally-closed contact-pieces—viz., contact-strip 21 and pawl 20'—are brought together momentarily, the latter pair of contact-pieces being brought together only after the wheels have passed completely over the track-instrument track-sections. Had the wheels passed over the track-instrument track-sections in the opposite direction roller 33' would have descended first, swinging arm 30 would have been deflected to the right, contact would have been broken momentarily between contact-levers 35 and 37, and contact would have been made momentarily between contact-strip 21' and pawl 20. It will therefore be seen that the track-instrument operates different sets of contact points or pieces according to the direction in which the wheels of a train pass over the track-instrument.

In both of my two registering systems of signals upon which I have filed an application for Letters Patent of even date herewith the registering-circuits are circuits which are normally closed and which are broken each time that the registering mechanisms are to be operated, while the canceling mechanisms are operated by normally-open circuits, which are closed each time that the canceling mechanisms are to be operated, this choice of circuits being preferred because it gives the highest safety factor. For use in these systems, therefore, the registering-circuits are operated by the contact-points operated by the movements of the swinging arm 30, while the canceling-circuits are operated by the contact-points operated by the ratchet-wheels and armature-levers.

It is evident that contact-points for operating normally-open circuits might be operated by the swinging arm 30, and it might therefore seem that there is a needless complication in causing the canceling-circuits to be operated by the contact-points operated by the armature-levers and ratchet-wheels instead of by contact-points operated by the swinging arm 30. The reason for the operation of the canceling-circuits in the manner described will be seen, however, from the following consideration: Supposing, as before, that a pair of wheels pass from track-section 50 onto track-instrument track-section 52, the swinging arm will be deflected to the left and the contact-pieces 37 and 38 separated, thus operating a registering-circuit for one direction of train movement. If the canceling-circuit was operated by a pair of normally-separated contact-points brought together by this movement of the swinging arm, then when the wheels moved onward and off from the track-instrument this canceling-circuit would likewise have been operated; but if, instead of moving onward after so bringing together the canceling-circuit contact-points the wheels moved backward again, the same set of canceling-circuit contact-points as before would have been operated—that is, the canceling-circuit for the wrong direction of movement would have been operated. This difficulty is avoided with the arrangement of contact-point-operating mechanism adopted in this track-instrument. When a pair of wheels pass from track 50 onto section 52, contact-pieces 37 and 38 are separated, thus operating a registering-circuit. If the wheels pass on over the track-instrument track-sections, armature-lever 14 rises without a circuit being completed by its contact-strip 21 and armature-lever 14' falls. When the wheels pass off from track-section 52', armature-lever 14' rises, ratchet-wheel 18' revolves, and contact is made between contact-strip 21 and pawl 20'; but if instead of passing off from track-section 52 onto track-section 52' the wheels had moved backward again into section 50 then armature-lever 14' would not have fallen and contact-strip 21' would have made contact with pawl 20, thus operating an entirely different canceling-circuit corresponding to the direction of movement of the wheels at the instant when the contact-points are brought together, and with contact-points so operated it is possible to so operate the circuits of a signal system that no movement of a train can cause a false operation of the registers.

As many sets of contact-points may be operated by the swinging arm 30 as may be desired, the shaft 31 being prolonged to the desired extent and contact-levers mounted thereon. If necessary, other sets of contact-points may be operated by the armature-levers 14 and 14′, any desired number of ratchet-wheels being operated by these levers and any desired arrangement of contact-pawls being made.

Figure 1:
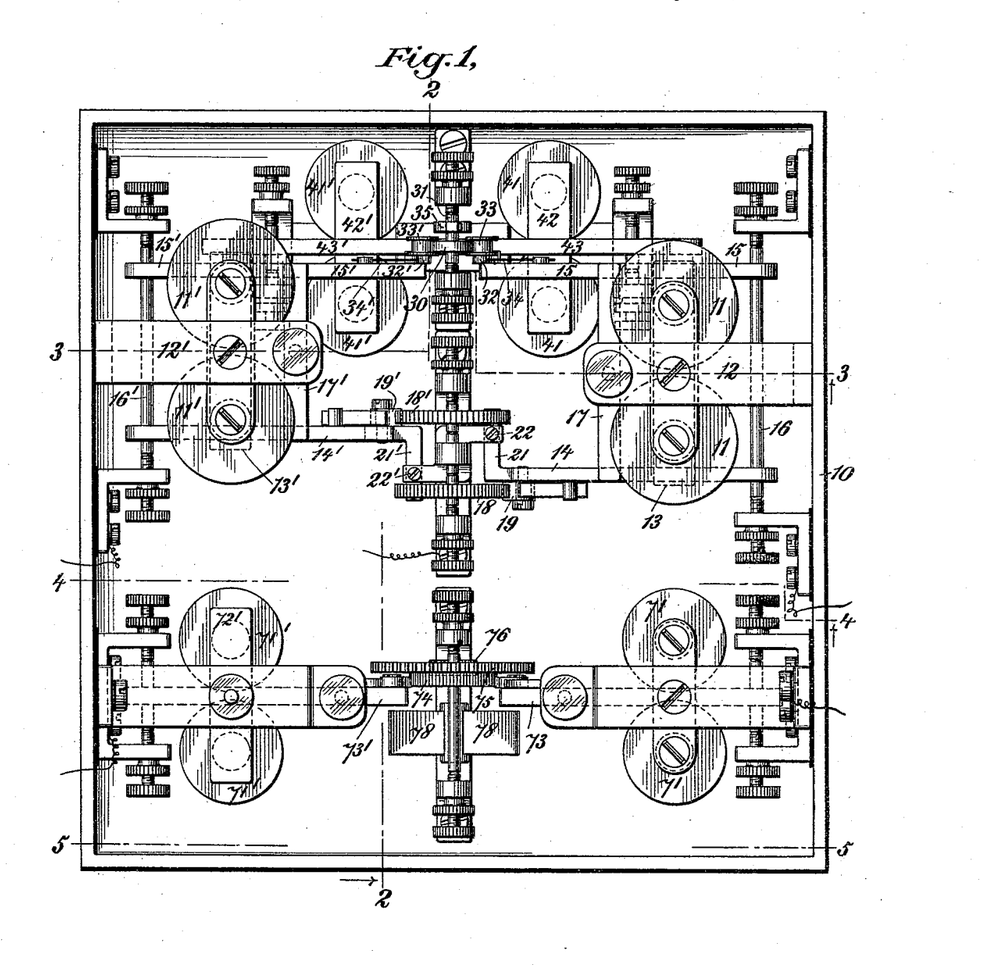
Figure 1 is a plan view of my track-instrument, a portion of the registering contact-point mechanism shown in elevation in Fig. 3—viz., the bracket 36 and the parts carried thereby—being omitted for the sake of clearness.
Figure 2:
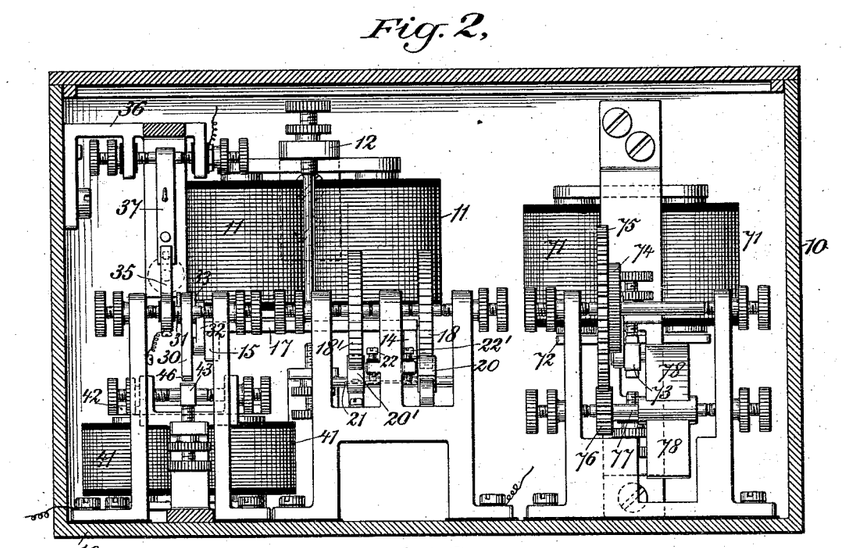
Fig. 2 is a longitudinal sectional elevation of the mechanism of the track-instrument, taken on the irregular section-line 2 2 of Fig. 1.
Figure 3:
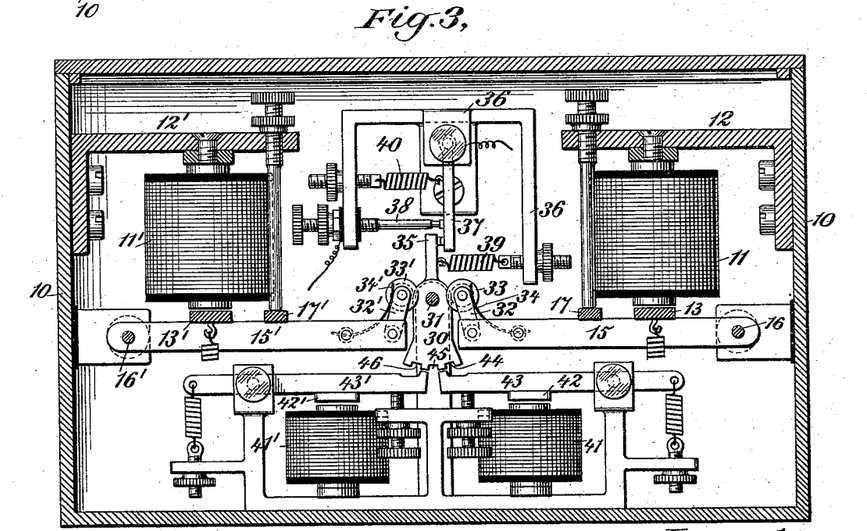
Fig. 3 is a transverse sectional elevation taken on the line 3 3 of Fig. 1, and showing the mechanism for operating the registering-circuit contact-points, the section being so taken as to include no other portions of the mechanism of the track-instrument.
Figure 4:
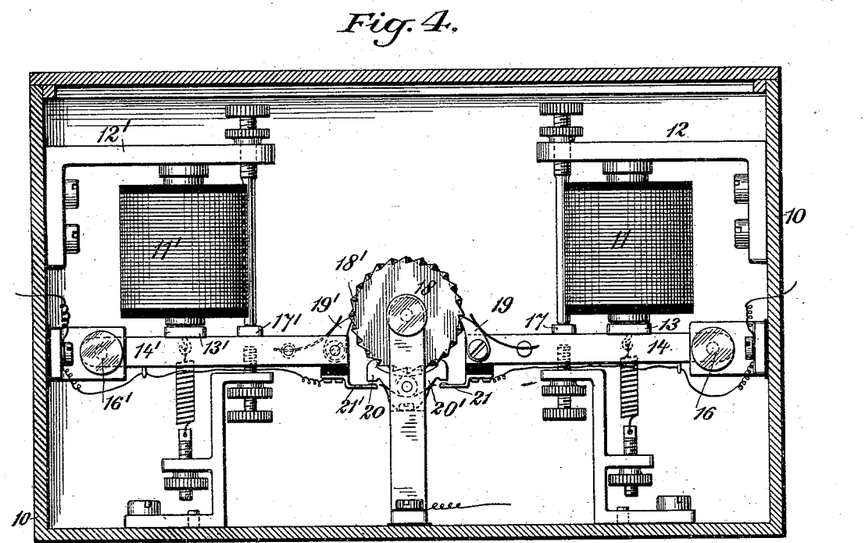
Fig. 4 is a transverse sectional elevation taken on the line 4 4 of Fig. 1, omitting the mechanism shown in Fig. 3 and showing the mechanism for operating the canceling-circuit contact-points.
Figure 7:
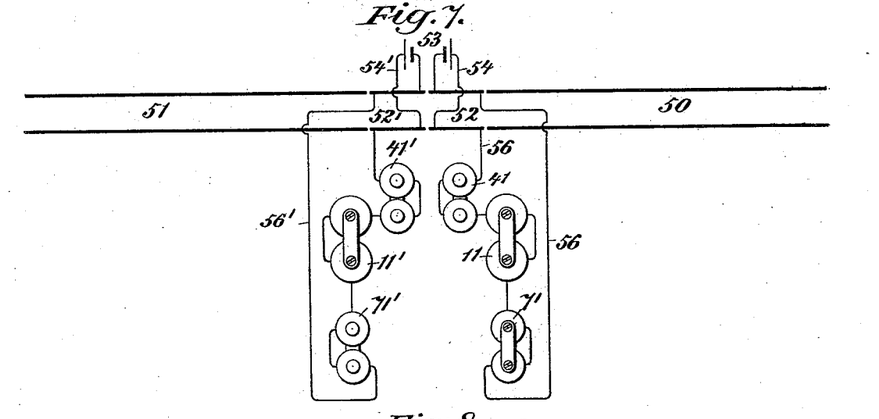

Under certain circumstances it is desirable to cause the track-instrument to so operate one or more sets of contact-points that a circuit may be broken or closed, as may be desired, so long as a pair of wheels are on the track-instrument track-sections and for a considerable period thereafter, if necessary. A mechanism for accomplishing this purpose is illustrated in Fig. 5, which mechanism is shown in plan in the lower portion of Fig. 1 and in partial section on the right-hand side of Fig. 2. 71 and 71′ are the magnets which operate this mechanism, and which, for reasons hereinafter apparent, may be termed "fan-magnets." Preferably, they should be placed in the same circuit with magnets 11 and 41 and 11′ and 41′, as is shown in Figs. 6 and 7. The armatures 72 and 72′ of these magnets are carried by pivoted armature-levers 73 and 73′. Springs are provided for drawing the armatures away from the magnets when the magnets are de-energized, and each armature-lever is provided with two stop-screws for limiting its motion, one of these stop-screws, the one against which the armature normally rests, in each case constituting a contact-piece, while the other screw is insulated. 74 is a fine-toothed ratchet-wheel, revolubly mounted between the ends of the armature-levers 73 and 73′, and each armature-lever is provided with a suitable spring-actuated pawl for engaging with the teeth of this wheel.

75 is a gear-wheel secured to the shaft to which ratchet-wheel 74 is secured, and 76 is a pinion secured to a revolubly-mounted shaft 77, upon which a number of fan-blades 78 are mounted.

The contact-points of levers 73 and 73′ control the same circuit which passes in series through them, as is shown in Fig. 5. As was stated above, the object of this mechanism is to keep this circuit broken while wheels are on the track-instrument rail-sections, and for a short period of time thereafter. The opertion of the mechanism is as follows: Supposing a pair of wheels to pass from section 50 of the track to track-section 52, then magnet 71 is de-energized at the same time with magnets 11 and 41 and the armature-lever 73 falls, thus breaking the circuit passing through the contact-points of the fan mechanism. When the wheels pass on into track-section 52′ armature-lever 73′ rises, breaking the circuit in another place, and the armature 72 is attracted by magnet 71, causing it to rise with its armature-lever; but since the pawl of the lever 73 engages with a tooth of wheel 74, the wheel is caused to revolve against the resistance offered by the chain of gears between wheel 74 and the fan-blades, and against the resistance offered by these fan-blades, and the lever 73 is much retarded in rising and is permitted to rise only very slowly. When the wheels have passed off from track-section 52′, the armature-lever 73′ falls and its pawl engages with a tooth of the wheel 74, and since the lever 73′ is on the opposite side of the wheel 74 from the lever 73 the motion of the armature-lever 73′ in falling corresponds with the direction of movement of that side of the wheel 74; but owing to the resistance offered by the fan the wheel 74 can revolve but slowly, and therefore the movement of the armature-lever 73′ is retarded, and the contact-point of this lever does not come into contact with its contact-screw until the car-wheels have passed some little distance beyond the track-section 52′, and therefore the circuit through these contact-points remain broken until that time, and if the wheels pass over the track-instrument track-sections very rapidly it may happen that the circuit through these contact-points will be broken during the whole time that the train is passing over the track-instrument. It will be seen, therefore, that by this mechanism it is possible for the track-instrument to keep a circuit broken for some time after the passage of a pair of wheels over the track-instrument. In systems where such a circuit is not required the fan mechanism of this track-instrument may be dispensed with and the other portions of the mechanism used alone, as the operation of the fan mechanism is independent of that of the rest of the mechanism of the track-instrument.

If required, the fan mechanism may be caused to complete a normally-broken circuit and to keep this circuit closed while wheels are passing over the track-instrument and for a short time thereafter.

Instead of using the fan-train herein shown for retarding the motion of the armature-levers 73 and 73′ other devices, as dash-pots, may be used.

The amplitude of movement of the armature-levers 73 and 73′ should be much greater than the pitch of the ratchet-teeth, the ratchet-wheel being provided with a large number of teeth, so that the pawls will engage with a tooth at once on beginning to return to the magnets.

In Fig. 7 there is illustrated an arrangement of track-circuits whereby the circuits of the two track-instrument track-sections have separate batteries, and there is no occasion for the use of resistance-coils, such as 55 and 55′ of Fig. 6. In other respects the circuits are substantially the same as in Fig. 6 and need no description.

Figure 8:
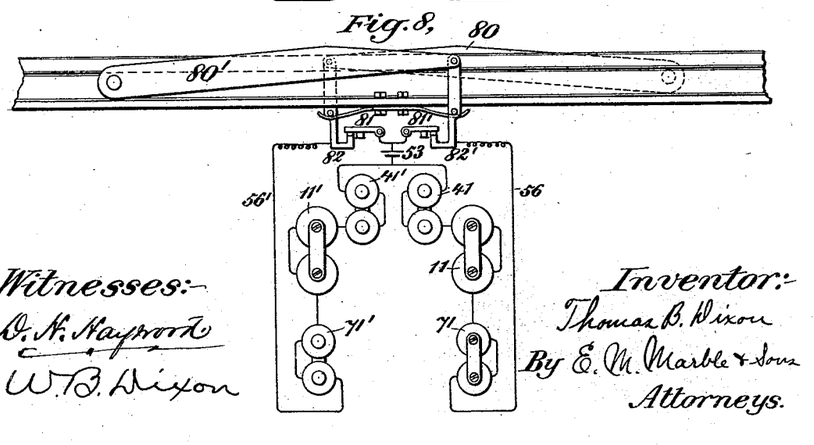
Fig. 8 is a view illustrating how the track-instrument may be operated by rail-levers instead of the insulated track-sections.

Fig. 8 illustrates how the circuits for operating the mechanism of the track-instrument may be operated by rail-levers instead of by the insulated track-sections 52 and 52'. Two rail-levers 80 and 81 are pivoted to the track-rails or to supports adjacent thereto, one on one side of the track and the other on the other side thereof, and springs are provided for pressing these rail-levers upward, so that normally they will project slightly above the tops of the rails. Below the rails are placed contact-points corresponding to each rail-lever, each set of contact-points being arranged in any suitable manner to be operated by the depression of its corresponding rail-lever. In this manner the circuits of conductors 56 and 56' may be controlled in substantially the same manner by rail-levers as by insulated track-sections across the rails of which the battery may be short-circuited. The rail-levers are so formed that the one first depressed has risen about half-way before the second rail-lever begins to descend. If the separate wheels of each car are to be registered, the length of the two rail-levers projecting above the tops of the rails must be less than the distance between two adjacent axles of a car. If trucks are to be registered as units, the length of the rail-levers must be greater than that of a truck, but less than the length of a car. Similarly, it may be possible to find a length for the rail-levers such that cars may be registered as units, or the rail-levers may be placed out of the reach of the car-wheels and special arms may be provided, projecting from the cars, for operating the rail-levers. If the levers be made longer than the length of the longest car, then trains may be registered as units, or the track-instrument so operated may be used in non-registering systems.

In Fig. 6 there is illustrated a method for avoiding danger due to the failure of the insulation between the rails of track-sections 52 and 52'. The effect of the failure of the insulation at this point would be to prevent magnet 11 from being energized when a pair of wheels passed from track-section 52 to section 52', nor would magnet 11 be energized until the pair of wheels had passed completely off from track-section 52', when magnets 11 and 11' would be energized simultaneously, the armature-levers 14 and 14' of these magnets would rise simultaneously, and the canceling-circuits for both directions of train movement would be operated together, whereas since there is a fault in the circuits it is more desirable that the canceling-circuits should not be operated at all. By the device illustrated in Fig. 6, however, the operation of the canceling-circuits is prevented when the insulation between track-sections 52 and 52' fails.

85 is a delicate relay, the magnets of which are wound with two separate coils. One of these coils is included in the circuit of conductor 56 and the other in the circuit of conductor 56'. So long, therefore, as current is flowing in at least one of the coils of the relay the armature of the relay will remain up; but if for any reason the insulation between the track-sections 52 and 52' should fail then a pair of wheels on one of these track-sections will short-circuit the battery in both circuits and the armature of relay 85 will fall. To illustrate the effect of the fall of this armature the canceling-circuit contact-points of the track-instruments 20' and 21 and 20 and 21' have been diagrammatically illustrated.

In general the canceling-circuits passing through these contact-points will or may be supplied from a common battery, and the circuit of this battery is caused to pass through contact-points of the relay 85, which are closed when the armature is up, but are separated by the fall of the armature. The fall of the armature of the relay 85 will therefore make the operation of the canceling-circuits impossible and will prevent the setting to "safety" of the signals of the block until the defect in insulation is remedied.

If it is desired to connect the canceling-circuits to separate batteries the armature of relay 85 may be provided with two separate sets of contact-points. The fall of the armature of relay 85 may be caused to ring an alarm-bell or in some other suitable manner to indicate that the insulation between the rail-sections is broken.

It may occasionally happen that a wheel in passing over the track-section 52 and 52' will momentarily be in contact with rails of both track-sections, and thus will form a connection between these sections; but it will be noticed that this can cause no false operation of the canceling-circuits, nor can it interfere in any manner with the operation of those circuits, for the instant that the wheel ceases to be in contact with the rail of one track-section the circuit of that section will be restored to its line, while the circuit of the other track-section will not be restored until the wheel has passed over that track-section as well.

Having thus completely described my invention, what I claim, and desire to secure by Letters Patent, is—

1. In a track-instrument, the combination, with two sets of contact points and a swinging arm arranged to operate the one set or the other according to the direction in which said arm swings, of two magnets each arranged when operated to tend to cause said arm to swing, the said magnets acting to swing said arm in opposite directions, circuits for operating said magnets arranged to be operated by a passing train, and to cause said magnets to be operated successively, and a locking device arranged to hold the said pivoted arm in the position in which the magnet first operated placed it while the second magnet is acting on said arm, substantially as described.

2. In a track-instrument, the combination, with two sets of contact-points, and a swinging arm arranged to operate the one set or the other according to the direction in which said arm swings, of two operating magnets, an armature and armature lever for each of said magnets, acting on said arm and adapted, when its magnet is operated, to tend to swing said arm, said armature levers acting in opposite directions upon said arm, a locking device arranged to hold said pivoted arm in the position in which it is placed by one armature lever while the other armature lever is acting upon it, and circuits for operating said magnets arranged to be operated by a passing train and to cause said magnets to be operated successively, substantially as described.

3. In a track-instrument, the combination, with two sets of contact points, and a swinging arm arranged to operate the one set or the other according to the direction in which said arm swings, of two magnets, an armature and armature lever for each of said magnets, spring actuated pressure pieces carried by said armature levers and pressing against opposite sides of said swinging arm, and each adapted, when its corresponding magnet is operated, to tend to cause said arm to swing, a locking device arranged to hold said pivoted arm in the position in which it is placed by one armature lever while the other armature lever is acting upon it, and circuits for operating said magnets arranged to be operated by a passing train and to cause said magnets to be operated successively, substantially as described.

4. In a track-instrument, the combination, with two sets of contact points and a swinging arm arranged to operate the one set or the other according to the direction in which said arm swings, of two magnets each arranged when operated to tend to cause said arm to swing, the said magnets acting to swing said arm in opposite directions, circuits for operating said magnets arranged to be operated by a passing train and to cause said magnets to be operated successively, locking levers adapted to engage with notches in said pivoted arm, and magnets controlling said levers and arranged to hold said arm locked in the position in which it is placed by one operating magnet while the other operating magnet is acting on said arm, substantially as described.

5. In a track-instrument, the combination, with suitable contact points, of actuating mechanism therefor, and means, operated by wheels passing over the track-instrument, for operating said contact point actuating mechanism, said mechanism being arranged to retain said contact points in normal condition when first operated by wheels passing over the track-instrument and to operate said contact points in returning to normal after the passage of said wheels over the track-instrument, whereby the operation of said contact points is prevented until the wheels have passed completely over the track-instrument, substantially as described.

6. In a track-instrument, the combination, with two sets of contact points, of actuating mechanism therefor arranged to operate the one set of contact points or the other according to the direction in which the train passes over the track-instrument, and means, operated by wheels passing over the track-instrument, for operating said contact point actuating mechanism, said mechanism being arranged to retain in normal condition that set of contact points operated when said mechanism is first operated by the wheels passing over the track-instrument and to operate said contact points in returning to normal after the passage of said wheels over the track-instrument, whereby the operation of said contact points is prevented until the wheels have passed completely over the track instrument, substantially as described.

7. In a track-instrument, the combination, with two sets of contact points, of two interacting actuating mechanisms corresponding each to one of said sets of contact points and each arranged, when first operated, to retain its contact points in normal condition, and to operate said contact points when returning to normal, each of said mechanisms being connected with the other mechanism and arranged to prevent the operation of the contact points thereby when said first-named mechanism is not in normal position, and means, operated by wheels passing over the track-instrument, for operating said mechanisms successively and concurrently and in an order corresponding to the direction of motion of said wheels, whereby the mechanism last operated is caused to operate its contact points and to prevent the operation by the other mechanism of the contact points of that mechanism, substantially as described.

8. In a track-instrument, the combination, with two sets of contact points, of two interacting actuating mechanisms corresponding each to one of said sets of contact points and each arranged, when first operated, to retain its contact points in normal condition, and to operate said contact points when returning to normal, each of said mechanisms being connected to an arm carrying one of the contact points of the other mechanism and being arranged to prevent those contact points from being operated while said first-named mechanism is not in normal condition, and means, operated by wheels passing over the track-instrument, for operating said mechanism successively and concurrently and in an order corresponding to the direction of motion of said wheels, substantially as described.

9. In a track-instrument, the combination, with two sets of normally separated contact points, of two interacting actuating mechanisms corresponding each to one of said sets of contact points and each arranged, when first operated, to retain its contact points separated, and to bring said contact points together when returning to normal, each of said mechanisms being connected to an arm carrying one of the contact points of the other mechanism and being arranged to prevent said contact point from making contact with its corresponding contact point while said first-named mechanism is not in normal condition, and means, operated by wheels passing over the track-instrument, for operating said mechanisms successively and concurrently and in an order corresponding to the direction of motion of said wheels, substantially as described.

10. In a track-instrument, the combination, with two sets of contact points, of two interacting actuating mechanisms corresponding each to one of said sets of contact points and each arranged, when first operated, to retain its contact points in normal condition, and to operate its contact points when returning to normal, each of said mechanisms being connected with the other mechanism and arranged to prevent the operation of the contact points thereby when said first-named mechanism is not in normal position, an electro-magnet, corresponding to each actuating mechanism, for operating the same, and electric circuits connected to said magnets and arranged to be operated successively when wheels pass over the track-instrument, whereby said mechanisms are operated successively and concurrently and in an order corresponding to the direction of motion of said wheels, substantially as described.

11. In a track-instrument, the combination, with two magnets, armatures and armature levers therefor, a ratchet wheel corresponding to each of said magnets, and means for causing each armature lever, when operated, to rotate its corresponding ratchet wheel, of a contact piece bearing against the teeth of each ratchet wheel and arranged to be operated by the movement thereof, a contact piece operated by each armature lever and adapted to make contact with the contact piece of the ratchet wheel corresponding to the other armature lever, when only the contact piece of said ratchet wheel is operated, and circuits for operating said magnets arranged to be operated successively by wheels passing over the track-instrument, substantially as described.

12. In a track-instrument, the combination, with two magnets, armatures and armature levers therefor, a ratchet wheel corresponding to each of said magnets, and means for causing each armature lever, when rising, to rotate its corresponding ratchet wheel, of a contact piece bearing against the teeth of each ratchet wheel and arranged to be operated by the movement thereof, a contact piece carried by each armature lever and adapted to make contact with the contact piece of the ratchet wheel corresponding to the other armature lever, when said armature contact piece is up and said ratchet wheel rotates, and circuits for operating said magnets arranged to be operated successively by wheels passing over the track-instrument, substantially as described.

13. In a track-instrument, the combination, with contact points controlling electric circuits, and electrically operated actuating mechanism for operating said contact points, of insulated track sections and circuits and batteries connected therewith and arranged to operate said contact actuating mechanism when wheels pass over said track sections, and an electrically operated safety device, operated by the circuits connected to said track sections and controlling the circuits passing through said track-instrument contact points, and arranged to prevent the operation of the said circuits by said track-instrument contact points, when the insulation between said track sections fails, substantially as described.

14. In a track-instrument, the combination, with canceling circuit contact points for controlling canceling circuits, magnets and suitable mechanism controlled thereby for operating said contact points, insulated track-sections, and circuits connected therewith and arranged to operate the mechanism of said track-instrument, of a relay having a multiple coil magnet, with its coils included within said track-circuits, and adapted to operate contact points of said relay when the insulation between said rail sections fails, said contact points being connected with said canceling circuits, and arranged to prevent the operation thereof when the insulation between said track sections fails, substantially as described.

In testimony whereof I affix my signature in presence of two witnesses.

THOS. B. DIXON.

Witnesses:
H. M. MARBLE,
J. ALEX. STITT.